United States Patent [19]
Rivière et al.

[11] Patent Number: 5,807,488
[45] Date of Patent: Sep. 15, 1998

[54] EXCHANGEABLE FILTER MEDIUM CONTAINER AND METHOD OF CONNECTING AND RECYCLING SUCH CONTAINERS

[75] Inventors: John La Rivière, Beaconsfield; Denis Brunelle, Pointe Claire; Bernard Gravel, Pointe Claire; Gordon Bathurst, Pointe Claire, all of Canada

[73] Assignee: Metafix Inc., Quebec, Canada

[21] Appl. No.: 802,125

[22] Filed: Feb. 19, 1997

[51] Int. Cl.⁶ .................................................. B01D 25/02
[52] U.S. Cl. ......................... 210/688; 210/232; 210/254; 210/284; 210/335
[58] Field of Search ..................................... 210/660, 688, 210/807, 232, 254, 284, 240, 237, 238, 234, 505, 305, 306

[56] References Cited

U.S. PATENT DOCUMENTS

| | | | |
|---|---|---|---|
| 3,595,397 | 7/1971 | Abos | 210/232 |
| 4,855,046 | 8/1989 | Meehan | 210/232 |
| 4,925,552 | 5/1990 | Bateson et al. | 210/284 |
| 5,211,851 | 5/1993 | Meurer | 210/232 |
| 5,328,605 | 7/1994 | Lin | 210/238 |
| 5,397,468 | 3/1995 | Chomka et al. | 210/232 |
| 5,552,043 | 9/1996 | Noordhoff | 210/232 |

*Primary Examiner*—Thomas G. Wyse
*Attorney, Agent, or Firm*—Fishman, Dionne, Cantor & Colburn

[57] ABSTRACT

The container is made of a single blow molded piece having a pair of vertical column chambers, inlet and outlet connectors and tubes connecting the inlet and outlet connectors to circulate fluid through the vertical column chambers in series. Each container is filled with a recyclable filter medium and the container can be recycled with the filter medium. When the filter container is replaced, the entire filter container is sent for recycling. The filter container can be attached to other filter containers to form a compact filter assembly or the container can be mounted to a wall to be stored out of the way. When the containers are connected together, they can be arranged to be easily connected in series and when replacing spent filter containers, it is possible to replace only some of the containers connected in series to leave partially spent containers in the fluid circuit for further use while new containers are added to an outlet side of the containers connected in series.

23 Claims, 5 Drawing Sheets

EXCHANGEABLE FILTER MEDIUM CONTAINER AND METHOD OF CONNECTING AND RECYCLING SUCH CONTAINERS

FIELD OF THE INVENTION

The present invention relates to a container for an exchangeable filter medium and to a method of connecting and recycling such filter medium containers. More specifically, the present invention relates to an exchangeable filter medium container which is arranged upright with an inlet and outlet provided near a top of the container so as to prevent spills of liquid during exchange. The invention also relates to such a filter medium container which is essentially made of a single blow molded piece. In this specification, the term "filter medium" includes media which physically absorb or screen substances, and media which neutralize substances biologically or chemically either with or without consumption of the media, and in particular media which undergo ion exchange with substances, as is the case with iron exchanged for silver.

BACKGROUND OF THE INVENTION

In the photographic film processing industry, waste solutions containing silver ions are produced. A large percentage of the silver can be recovered by electrolytic means, as is known in the art. The waste solutions after electrolysis still contain a low concentration of silver ions. Environmental regulations prohibit any appreciable quantities of silver ions being discharged into public sewers.

The most widespread method used to handle the left over silver concentration is the use of metal ion exchange filters. In these filters, iron is most commonly used as a filter medium, and the iron reacts with the silver ions with the result that iron ions are released into solution and the silver remains in the filter medium. The iron is usually found in the form of steel wool or iron powder, and sometimes in the form of chopped steel wool or iron filings. The filter containers for such metal ion exchange filters in the prior art have a variety of shaped and configurations. See for example, U.S. Pat. Nos. 4,325,732, 4,988,448, 5,084,168 and 5,298,170 to Woog. Such filters must have their contents recycled to recover the silver, once the iron medium is sufficiently consumed, in order to prevent silver ions in solution from passing through the filter.

Four primary difficulties with the prior art filter containers have been identified by Applicants, namely, connection of the container to existing plumbing (hose connections) when replacing old filter media containers with new ones, the large amount of floor space required in a photographic development room to store the filter container(s), the difficulty in removing filter media from the containers during recycling of the filter media, and the uneven consumption of the filter medium in the container. The last difficulty, in the case of metal ion exchange filters for silver recovery, leads to early changeover of the filter medium and less silver present per unit volume of filter medium recycled.

SUMMARY OF THE INVENTION

It is an object of the present invention to overcome the difficulties associated with the prior art filter medium containers.

According to the invention, there is provided an exchangeable filter medium container having a top and a bottom, the container comprising: a first vertical column chamber for containing a filter medium; first tube means communicating with a bottom of the column chamber, the tube means extending externally alongside the chamber to the top, the first tube means and the first column chamber being integrally formed; and connecting means provided at the top of the container for connecting a fluid inlet and outlet to the tube means and the vertical column chamber.

According to the invention, there is also provided a recyclable exchangeable filter medium container having a top and a bottom, the container comprising: a first vertical column chamber for containing a filter medium, the filter medium being recyclable when consumed after use, the first column chamber being made of a material able to be compatibly recycled with the filter medium; and connecting means for connecting a fluid inlet and outlet to the vertical column chamber.

According to another aspect of the invention, there is provided a method of connecting and recycling a plurality of filter medium containers each having a vertical filter medium containing column having an inlet and an outlet near a top of the column, the method comprising: connecting the containers in series with a first one of the containers receiving unfiltered fluid from an unfiltered fluid source and the outlet of a last one of the containers being connected to a drain; disconnecting the first one of the containers from the unfiltered fluid source and from a second one of the containers when it is believed that the first one of the containers has saturated filter medium; removing the first one of the containers for disposal; connecting the unfiltered fluid source to the second one of the containers; disconnecting the last one of the containers from the drain; obtaining another one of the containers; and connecting an outlet of the other one of the containers to the drain and an inlet thereof to the last one of said containers.

BRIEF DESCRIPTION OF THE DRAWINGS

The invention will be better understood by way of the following detailed description of a preferred embodiment with reference to the appended drawings in which.

DETAILED DESCRIPTION OF THE PREFERRED EMBODIMENT

Figure 1:
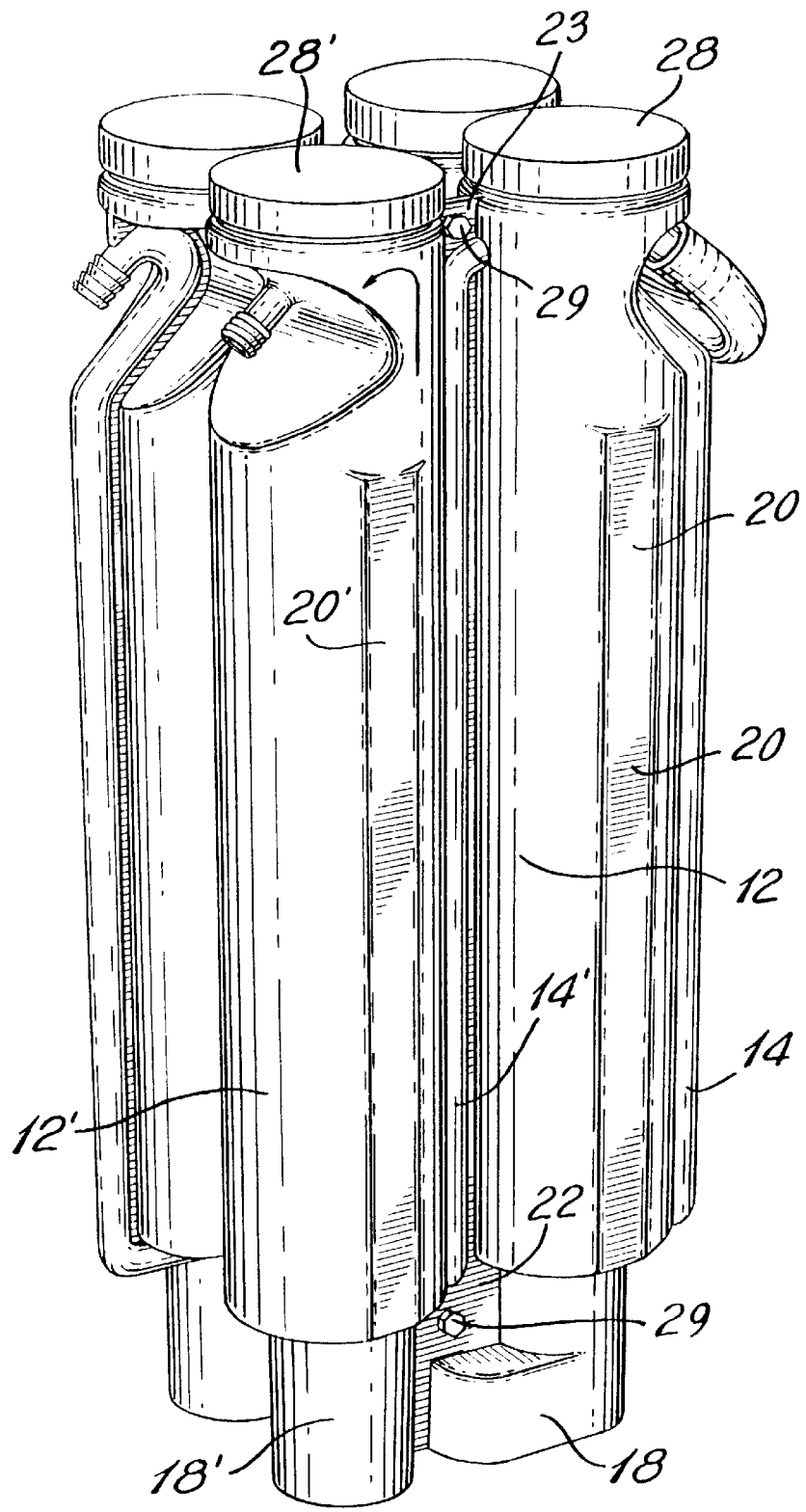
FIG. 1 is a perspective view of two exchangeable filter medium containers connected together according to the preferred embodiment.
Figure 2:
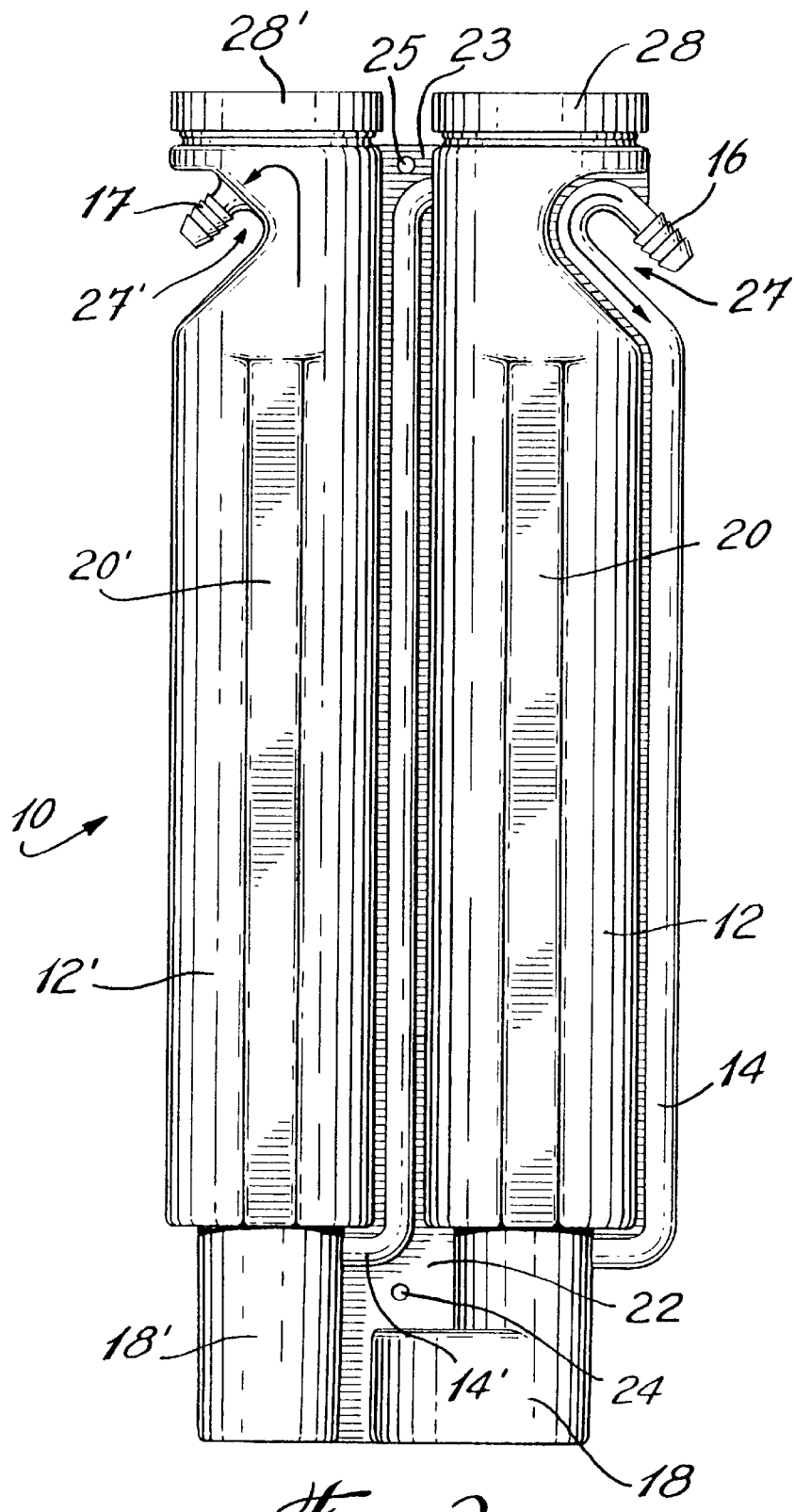
FIG. 2 is a side elevation view of the exchangeable filter medium container according to the preferred embodiment.

As illustrated in FIGS. 1 and 2, the exchangeable filter medium container 10 according to the preferred embodiment is made substantially of a single blow molded unit having a pair of vertical column chambers 12 and 12' for containing a filter medium. The vertical column chambers 12 and 12' have an aspect ratio of about 5:1 each resulting in a 10:1 ratio for both columns combined. An aspect ratio less than 4:1 is not efficient with respect to the case of the filter medium.

A first tube 14 communicates with a fluid inlet 16 at a top of the container and extends along the outside of the substantially cylindrical chamber 12 and communicates with a first well chamber 18. The well chamber 18 is substantially cylindrical of a smaller cross section with respect to chamber 12 and has an obround base. Fluid entering the inlet passes through tube 14 into the well 18 and then up through chamber 12 to a top thereof until the fluid communicates with the second tube 14' which extends from a top of chamber 12 into the second well chamber 18' which is also substantially cylindrically shaped. Fluid in the well 18' passes into chamber 12' which has substantially the same dimensions as chamber 12. The fluid rises through the filter medium in chamber 12' to a top of the chamber 12' and out through an outlet 17.

In the preferred embodiment, the tops of the chambers 12 and 12' are provided with screw top threads and fitted with identical lids 28 and 28'. A web material 22 and 23 interconnects the two sides of the container 10 and through holes 24 and 25 are provided for fastening the containers 10 to one another or to a mounting. The sides of the chambers 12 are provided with a substantially flat rectangular portion 20 and 20' respectively so that the side of the container 10 may be abutted flushly against a corresponding flat surface.

Figure 4:
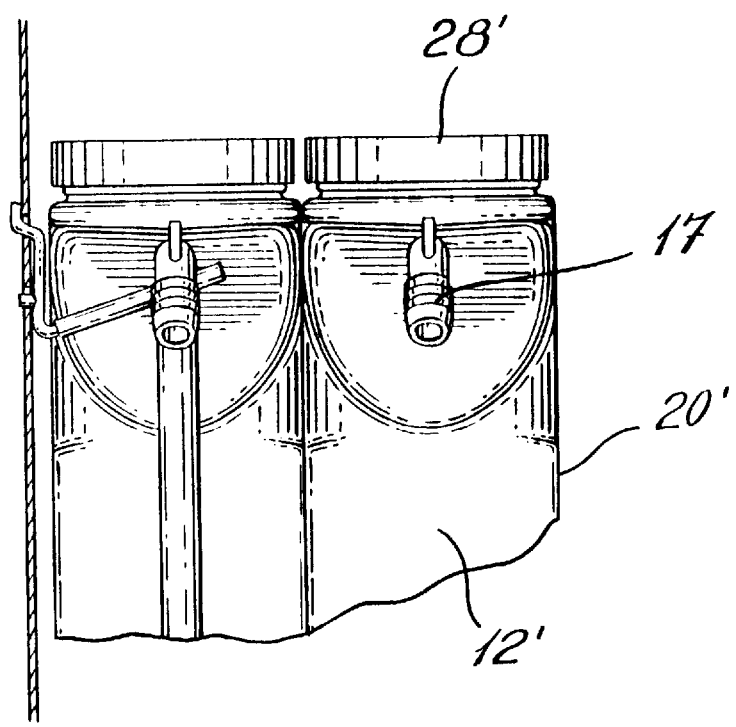
FIG. 4 is a partial side end view of two exchangeable filter medium containers connected together according to the preferred embodiment and support on a wall by a hook.

The inlet 16 and the outlet 17 have a barbed exterior surface for connecting to a hose with a hose clamp. They are preferably arranged to extend approximately 45° downwardly from the horizontal since this is typically the most common initial direction of extension of the hose to be connected to the inlet and to the outlet, and also this permits for a longer connection surface to be provided within the area of the recesses 27 and 27'. The downwardly extending members 16 and 17 also allow a hook member as shown in FIG. 4 to be used to mount the container 10 to a wall. The object of providing the inlet 16 and the outlet 17 within the recesses 27 and 27' respectively is that these portions of the container can be formed by the same parison as the blow molded container 10 without resulting unnecessary excessive amounts of flashing on the sides of the container 10.

In the preferred embodiment, the filter medium (shown at 15 in FIG. 5) is comminuted steel wool and serves to filter photographic fixer solution which contains a concentration of silver ions. It is common to process the solution using an electrolytic silver recovery processing stage to remove most of the silver before using the metal ion exchange filter to remove the remaining silver. Alternatively, the solution may be filtered directly. The silver is exchanged chemically for the iron in the steel wool and iron ions are released into the drain water while the silver remains in the steel wool matrix.

The blow molded containers 10 are made from high density polyethylene (HDPE) and the entire container 10 is disconnected from the photographic processing equipment after use at the photographic processing lab and sent for recycling. At the lab, the inlet 16 and the outlet 17 are capped, and at the recycling center, the entire container 10 is processed, involving melting down in order to retrieve the silver metal in the filter medium. HDPE can be burned, if necessary, without discharging harmful gases or residue, and is a strong plastic even when the blow molded walls are thin.

Figure 3:
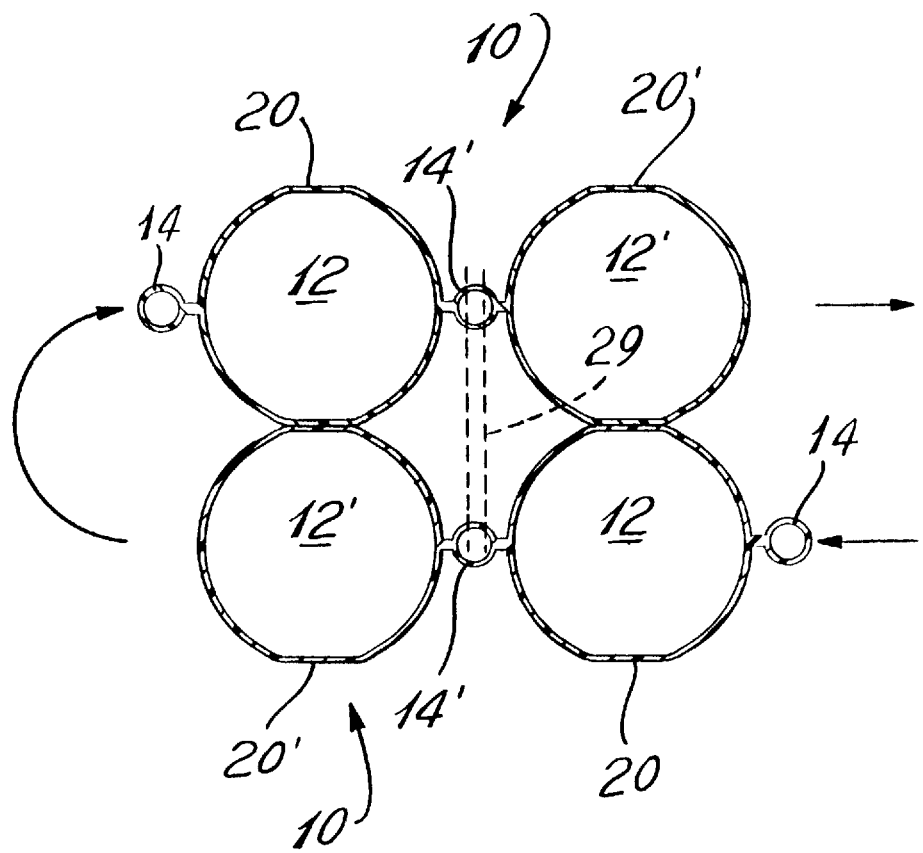
FIG. 3 is a horizontal cross-sectional view of two like containers connected in series as per the preferred embodiment.

As illustrated in FIGS. 1 and 3, the preferred method for connection of the filter containers is to connect the fluid communications through the containers in series. In the preferred embodiment, two or more filter containers can be interconnected as shown in FIGS. 1 and 3 in order to provide a compact unit which may be stood upright without the need for a stand or mounting. The flow of fluid goes into a first tube 14 up through a first chamber 20, down through a second tube 14 and through a second chamber 12'. An external hose connection (shown in FIG. 1 without hose clamps) is provided between the top of the second chamber 12' and is fed around to an inlet of tube 14 of the adjacent container where the fluid goes down into the bottom of the adjacent chamber 12 and then up through to a top of the adjacent chamber 12 and then down through the adjacent second tube 14' and then up through the adjacent second chamber 12' to the outlet. The flat surfaces 20 abut against corresponding flat surfaces 20' and a tie rod 29 shown in dashed lines in FIG. 3 is connected through through-holes 24 and 25. As can be appreciated, it would alternatively be possible to connect such filter units in parallel by providing a Y connection from a fluid source to the inlets and then a Y connection from the outlets to a drain.

The advantage of connecting the containers in series is that when a first filter medium container 10 is consumed, it may be detached from the adjacent container 10 and removed for recycling. The remaining adjacent container 10 can now be connected to the fluid source and a new container 10 can be attached to it in order to provide the same arrangement as in FIGS. 1 and 3 except that the first chamber 12 connected to the fluid source will likely be partially consumed since the previous first container 10 was substantially completely consumed. In this way, only those containers containing filter medium which is believed to be substantially completely consumed need be recycled while there is no danger that unfiltered fluid exits into the drain. This configuration need not be limited to two such filter containers but may be applied to any number of serially connected containers.

While the tie rod connector 29 shown in FIG. 3 can be used to connect two or more containers 10 together, other means of connecting the containers together is possible. For example, a pedestal could be provided having recesses for receiving the well chambers 18 and 18' which would allow the containers 10 to be held upright while being plugged into the pedestal base. Furthermore, it has been found to be a simple and useful way to store containers 10 as is illustrated in FIG. 4 by fastening them to a wall surface. The wall surface may be a building wall or the sheet metal wall of a housing of equipment associated with the filter containers 10. Mounting to the wall is achieved by providing ordinary wall hooks of the standard pegboard type in which a rod member extending away from the wall either horizontally with an upturned end or at a small angle upwardly having a length of about 4 to 8 cm is provided on the wall to hook under the inlet 16 and the outlet 17 inside the recess 27 and 27' respectively such that the wire hook member rests at the uppermost portion in the space underneath the inlet 16 and the outlet 17 to support the container 10. Such hook members are easily be added to the side or rear panels of existing photochemical processing equipment housings such that the containers 10 are stored in a place where easy access is possible for connecting and disconnecting hoses to the containers and the containers are safely stored out of the way.

Figure 5:
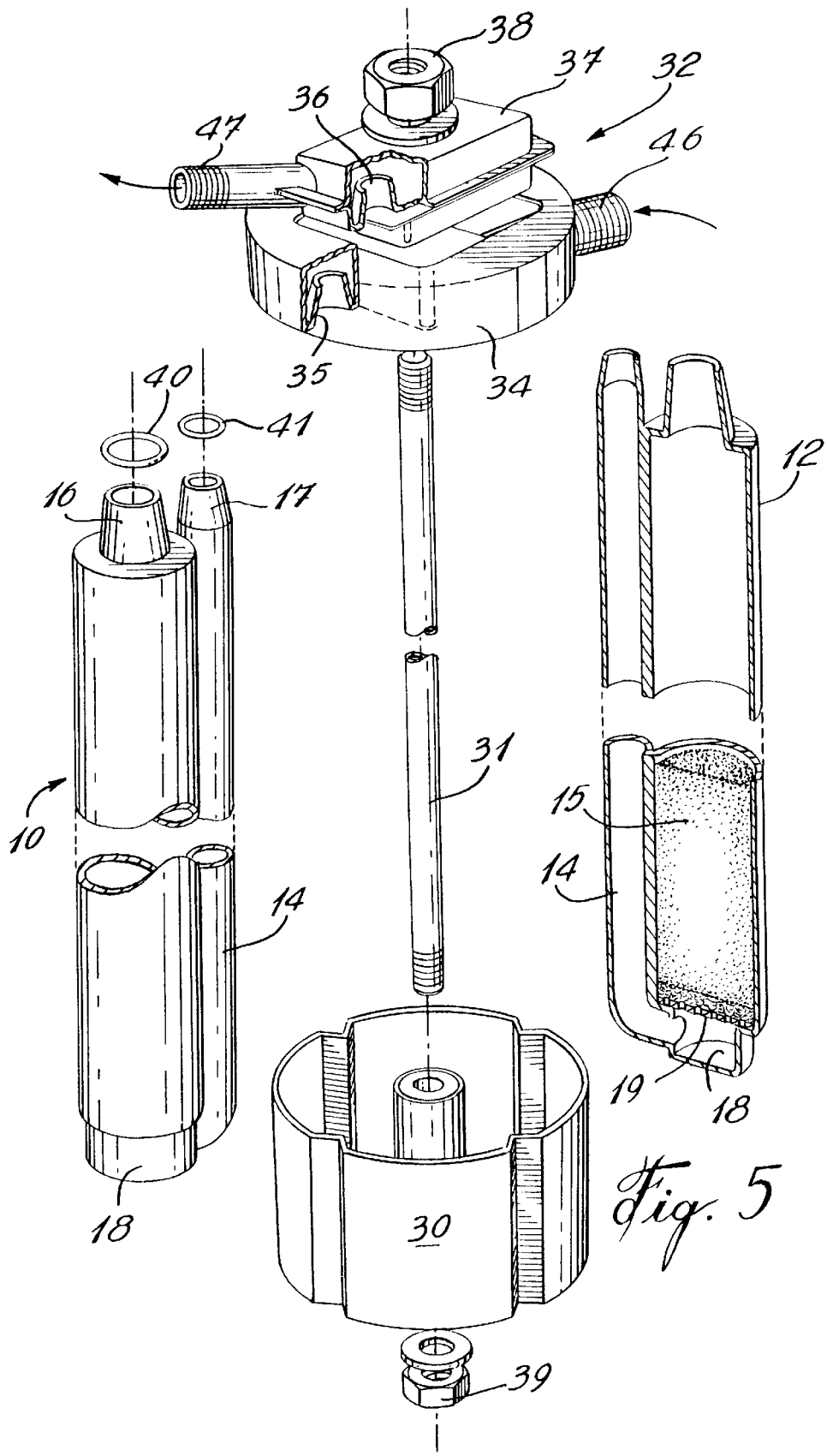
FIG. 5 is an exploded and partially sectional view illustrating an alternative embodiment of the present invention.

Illustrated in FIG. 5 is an alternative embodiment in which the containers contain a single column chamber 12. In this embodiment, the chambers 12 are shown filled with the comminuted steel wool filter medium 15 and the perforated plate 19 is shown at the bottom of the chamber 12 before the well chamber 18. Above plate 19, there is shown a thin layer of polypropylene wool material which prevents the filter medium from passing through into the well 18. A tube 14 extends along an outer side wall of chamber 12 and connects through to well 18.

In the alternative embodiment illustrated in FIG. 5, four containers 10 are received by a base 30 and are connected into a top fitting 32 having four fittings 35 for receiving the fittings 16 and four fittings 36 for receiving the fittings 17. In the alternative embodiment, the fluid enters a common manifold inlet 46 of the common manifold 34 such that fluid enters directly into chambers 12 down through the filter medium 15. Fluid then passes into well 18 and then up through tubes 14 into manifold 37 and through the outlet 47. By changing the manifolds 34 and 37, the parallel or serial connection of the containers 10 can also be changed.

To ensure a leakproof connection, seals 40 and 41 are provided on inlet 16 and outlet 17 respectively. A clamping force is provided by the tie rod 31 along with the appropriate fastening nuts 38 and 39. As shown, notches in the base 30 which fit into complementary grooves in the containers 10 facilitate arrangement and alignment of the containers 10 in the base 30. In the alternative embodiment, a grating member 19 is inserted into chamber 12 through an opening in the top of the chamber 12 and the inlet truncated conical member 16 is ultrasonically welded to the top of chamber 12.

Although not shown in the drawings, it is possible to add the polypropylene wool or batting to a top of the chamber on top of the filter medium 15 so as to prevent any of the filter medium from being circulated through the fluid circulation system and out the outlet.

As can be appreciated, in the alternative embodiment illustrated in FIG. 5, the containers 10 are integral blow molded members whereas the base and manifold components which are reused and not recycled may be made of blow molded plastic components or the like.

What is claimed is:

1. An exchangeable filter medium container having a top and a bottom, said container comprising:
    a first vertical column chamber for containing a filter medium;
    first tube means communicating with a bottom of said column chamber, said tube means extending externally alongside said chamber to said top, said first tube means and said first column chamber being integrally formed; and
    connecting means provided at said top of said container for connecting a fluid inlet and outlet to said tube means and said vertical column chamber.

2. The container as claimed in claim 1, wherein said inlet communicates with a top of said tube means, whereby fluid in said chamber flows from the bottom up to the top.

3. The container as claimed in claim 1, wherein said container is blow molded.

4. The container as claimed in claim 1, further comprising a first well chamber communicating with a bottom outlet of said column chamber and being formed integral therewith.

5. The container as claimed in claim 2, further comprising a first well chamber communicating with a bottom outlet of said column chamber and being formed integral therewith.

6. The container as claimed in claim 5, wherein said container is blow molded.

7. The container as claimed in claim 2, further comprising:
    a second vertical column chamber for containing a filter medium, and being integrally formed with said first column chamber;
    second tube means integrally formed with and extending vertically between said first and second column chambers for communicating a bottom of said second column chamber with a top of said first column chamber, wherein said inlet communicates with a top of said first tube means, and said outlet communicates with a top of said second column chamber.

8. The container as claimed in claim 7, further comprising:
    a first well chamber communicating with a bottom outlet of said first column chamber and being formed integral therewith;
    a second well chamber communicating with a bottom of said second column chamber and being integrally formed therewith,
    wherein said first tube means communicates with said first well chamber, and said second tube means communicates with said second well chamber.

9. The container as claimed in claim 8, wherein said container is blow molded.

10. The container as claimed in claim 9, wherein said first and second column chambers are substantially cylindrical in shape and have at least one flat side portion to permit a flat engagement against a similar such container or against a wall.

11. The container as claimed in claim 10, wherein said first and second column chambers have a flat side portion on both sides of said container, further comprising means for fastening said container to another such container with said flat side portion flatly engaging a flat side portion of another such container.

12. The container as claimed in claim 9, wherein a top portion of said first column chamber is recessed to accommodate a top portion of said first tube means, and a top portion of said second column chamber is recessed to accommodate said outlet.

13. The container as claimed in claim 9, wherein a bottom of said container is substantially flat, whereby said container can stand upright.

14. The container as claimed in claim 1, wherein a height to width aspect ratio of said first column chamber is at least 4:1.

15. The container as claimed in claim 3, wherein said filter medium is a metal ion exchange medium, and said container is made of a safely combustible plastic, whereby said container can be burnt along with the spent medium it contains during recovery of metal contained in the spent medium.

16. The container as claimed in claim 1, further comprising:
    mounting bracket means for mounting said container to hang from a wall or vertical panel, whereby said container can be removably mounted to a wall above, or to a side of, equipment connected to said container.

17. The container as claimed in claim 7, further comprising:
    mounting bracket means for mounting said container to hang from a wall or vertical panel, whereby said container can be removably mounted to a wall above, or to a side of, equipment connected to said container.

18. A recyclable exchangeable filter medium container having a top and a bottom, said container comprising:
    a first vertical column chamber for containing a filter medium, said filter medium being recyclable when consumed after use, said first column chamber being made of a material able to be compatibly recycled with said filter medium; and
    connecting means for connecting a fluid inlet and outlet to said vertical column chamber.

19. The container as claimed in claim 18, wherein said first column chamber is essentially made of a blow molded member having a substantially cylindrical shape and thin walls, said filter medium is a metal ion exchange medium, and said container is made of a safely combustible plastic, whereby said container can be burnt along with the spent medium it contains during recovery of metal contained in the spent medium.

20. A method of connecting and recycling a plurality of filter medium containers each having a vertical filter medium containing column having an inlet and an outlet near a top of the column, the method comprising:

connecting said containers in series with a first one of said containers receiving unfiltered fluid from an unfiltered fluid source and said outlet of a last one of said containers being connected to a drain;

disconnecting said first one of said containers from said unfiltered fluid source and from a second one of said containers when it is believed that said first one of said containers has saturated filter medium;

removing said first one of said containers for disposal;

connecting said unfiltered fluid source to said second one of said containers;

disconnecting said last one of said containers from said drain;

obtaining another one of said containers; and connecting an outlet of said other one of said containers to said drain and an inlet thereof to said last one of said containers.

21. The method as claimed in claim 20, wherein said containers each comprise a pair of interconnected vertical filter medium containing columns arranged adjacent to one another, one of said pair of columns having said inlet near a top thereof and another of said pair of columns having said outlet near a top thereof, said step of connecting said containers in series comprising arranging said containers side by side and connecting adjacent ones of said columns together.

22. The method as claimed in claim 21, wherein said plurality of containers is an even number, whereby said fluid source and said drain are on a same side.

23. The method as claimed in claim 21, wherein said containers are fastened together.

* * * * *